July 24, 1923.
G. HAINLEN
BUMPER FOR AUTOMOBILES
Filed Feb. 14, 1923    2 Sheets-Sheet 1
1,462,910
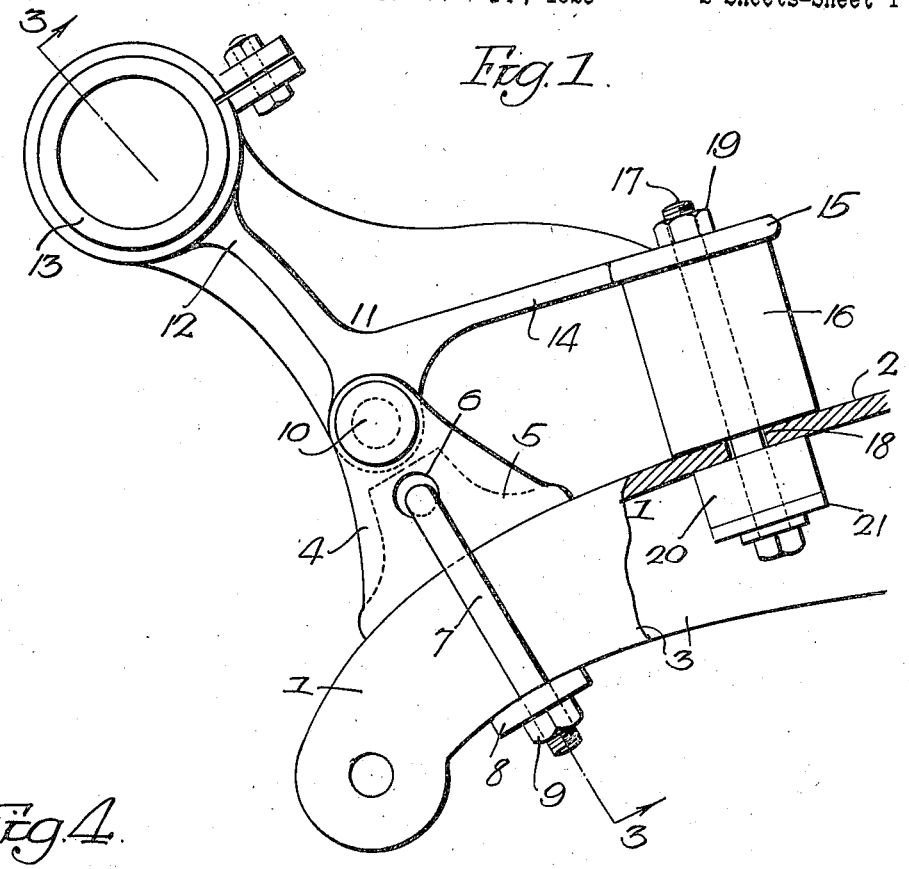
Fig.1.
Fig.4.
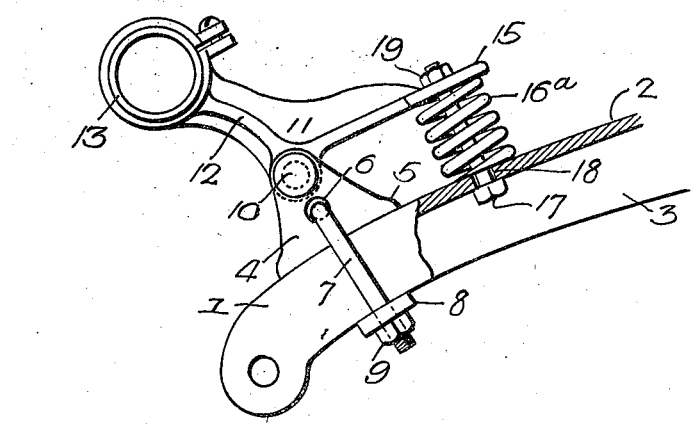
Inventor
George Hainlen.
by his Attorneys.

July 24, 1923.
G. HAINLEN
BUMPER FOR AUTOMOBILES
Filed Feb. 14, 1923   2 Sheets-Sheet 2
1,462,910
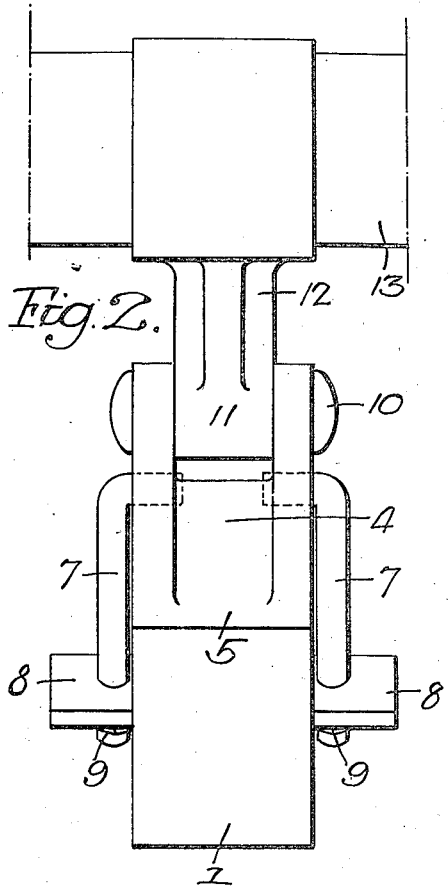
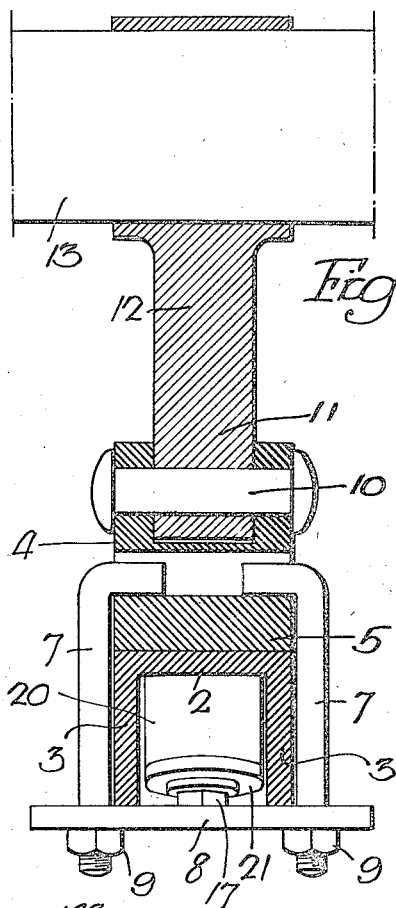
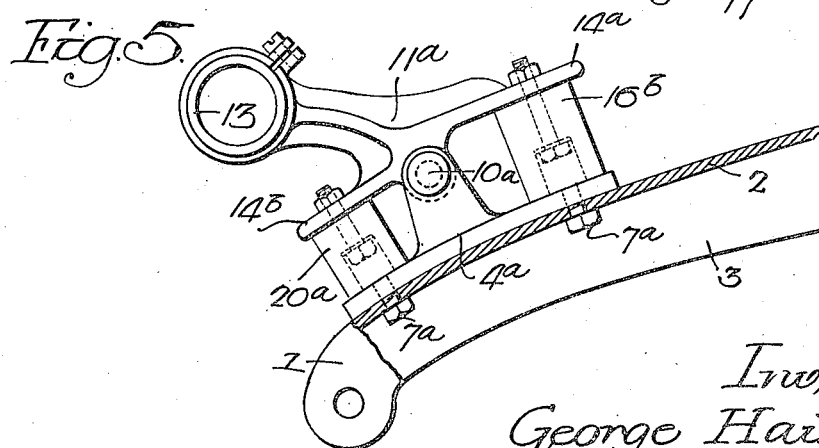
Inventor—
George Hainlen
by his Attorneys Patented July 24, 1923.

1,462,910

UNITED STATES PATENT OFFICE.

GEORGE HAINLEN, OF PHILADELPHIA, PENNSYLVANIA.

BUMPER FOR AUTOMOBILES.

Application filed February 14, 1923. Serial No. 618,975.

*To all whom it may concern:*

Be it known that I, GEORGE HAINLEN, a citizen of the United States, residing in Philadelphia, Pennsylvania, have invented certain Improvements in Bumpers for Automobiles, of which the following is a specification.

One object of my invention is to provide a yielding bumper for automobiles and other vehicles, which can be readily applied to automobiles in general without interfering with the standard parts of the machine.

A further object of the invention is to construct the supports of the bumper so that they can be mounted directly upon the side frames of the automobile, the frames acting as an abutment when the bumper strikes an object.

In the accompanying drawings:
Fig. 1 is a side view of my improved bumper for automobiles, the frame of the automobile being broken away to illustrate the invention more clearly;

Fig. 2 is a front view of one of the supports and a portion of the bumper bar;

Fig. 3 is a sectional view on the line 3—3, Fig. 1;

Fig. 4 is a side view showing the invention in its simplest form; and Fig. 5 is a view of a modification.

Referring to the drawings, 1 is one of the side frames of an automobile made in the form of a channel having a body portion 2 and side flanges 3, Fig. 3. There are two of these frames. Mounted on the upper surface of each side frame is a bearing 4 having an extended base 5. The bearing is perforated at 6 for the reception of the ends of the hooked bolts 7. These bolts extend on each side of the bearing and the frame 1 as shown in Figs. 2 and 3, and pass through a plate 8 extending under the frame 1. Nuts 9 are applied to the threaded ends of the hooked bolts so that the bearing can be adjusted to the frame and firmly secured thereto.

10 designates a pivot pin extending through the bearing and through a lever 11 mounted in the bearing. This lever is preferably of the bell crank type. One arm 12 of this lever has a clamp ring through which the bumper bar 13 extends. The other arm 14 of the lever extends rearwardly over the frame and has a seat 15 for a spring 16, which rests on the upper surface of the frame 1. This spring may be made of rubber, as shown in Fig. 1, or it may be a coiled spring, as shown in Fig. 4.

A rod 17 extends through an opening 18 in the frame 1 and through the spring 16 and seat 15 and is provided with a nut 19 adjustable thereon. This rod limits the movement of the lever.

In Fig. 1, the rod is shown as extending through another spring 20 located within the frame 1 and between the head of the rod and the spring is a plate 21.

By the construction hereinbefore described, when the bumper bar comes in contact with an object, the springs 16 will yield, absorbing the shock. If the bumper bar should be forced under an object, then the spring 21 yields to absorb the shock. In any case, the shock is taken directly by the frames, as the bearings and the lever supports for the bar are mounted directly above the frames.

In Fig. 4 a construction is illustrated, in which the second spring is dispensed with. In this instance, the spring 16$^a$ is of the coiled metallic type.

In Fig. 5, a modification is shown, in which the lever support 11$^a$ has two arms 14$^a$ and 14$^b$, one on one side of the pivot 10$^a$ and the other on the opposite side of the pivot. Located between the arm 14$^a$ and the frame 1 is a spring 16$^b$ and between the arm 14$^b$ and the frame is a spring 20$^a$. In this construction, the hook bolts are dispensed with and the bearing 14$^a$ is rigidly secured to the frame by bolts 7$^a$.

A bumper made in accordance with my invention can be securely attached to the side frames of the standard type of automobile, as the guards now universally employed do not interfere with the proper working of the mechanism, as the bearings, levers and the main springs are mounted directly upon the upper surfaces of the side frames.

I claim:

1. The combination of a side frame of an automobile; a bearing mounted on said frame; a bell crank lever pivotally mounted in the bearing; a bumper bar carried by one arm of said lever; and a spring located between the other arm of the lever and the upper surface of the frame.

2. The combination of a side frame of an automobile; a bearing secured to the upper surface of the frame; a lever pivotally mounted on the bearing and having two arms; a bumper bar carried by one arm of the lever; a spring mounted between the other arm of the lever and the upper surface of the frame; and a limit bolt extending through a perforation in the frame and through the spring and the arm of the lever.

3. The combination of a side frame of an automobile; a bearing mounted on the side frame; a lever pivoted to the bearing having two arms; a bumper bar secured to one of said arms; and a spring mounted between the other arm and the upper surface of the frame; a spring under the frame; and a limit bolt extending through both springs, the arm and the frame.

4. The combination of a side frame of an automobile; a bearing mounted on the upper surface of the frame; hooked bolts engaging the bearing and extending on each side of the frame; a clamp plate on the underside of the frame through which the bolts extend; a two-armed lever pivoted to the bearing; a bumper bar mounted on one of said arms; a spring mounted between the other arm and the upper surface of the frame; and a limit bolt extending through the frame and through the spring and its arm.

GEORGE HAINLEN.